(12) United States Patent
Raffy et al.

(10) Patent No.: US 10,479,730 B2
(45) Date of Patent: Nov. 19, 2019

(54) FUSED SPINEL-ZIRCONIA GRAINS AND REFRACTORY PRODUCT OBTAINED FROM SAID GRAINS

(71) Applicant: SAINT-GOBAIN CENTRE DE RECHERCHES ET D'ETUDES EUROPEEN, Courbevoie (FR)

(72) Inventors: Stéphane Raffy, Cavaillon (FR); Nabil Nahas, Marseilles (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 15/769,272

(22) PCT Filed: Oct. 19, 2016

(86) PCT No.: PCT/FR2016/052700
§ 371 (c)(1),
(2) Date: Apr. 18, 2018

(87) PCT Pub. No.: WO2017/068283
PCT Pub. Date: Apr. 27, 2017

(65) Prior Publication Data
US 2018/0290932 A1      Oct. 11, 2018

(30) Foreign Application Priority Data

Oct. 19, 2015 (FR) ...................... 15 59926

(51) Int. Cl.
*C04B 35/484*  (2006.01)
*C04B 35/443*  (2006.01)
(Continued)

(52) U.S. Cl.
CPC ........ *C04B 35/4885* (2013.01); *C04B 35/117* (2013.01); *C04B 35/119* (2013.01);
(Continued)

(58) Field of Classification Search
CPC ..... C04B 35/484; C04B 35/109; C04B 35/05; C04B 35/0473; C04B 35/4885
See application file for complete search history.

(56) References Cited

U.S. PATENT DOCUMENTS 3,993,119 A     11/1976  Scott
7,011,689 B2*    3/2006  Aleonard .............. C04B 35/109
                                                              264/319
(Continued)

FOREIGN PATENT DOCUMENTS

CN      1546421 A    11/2004
CN    101786889 A     7/2010
(Continued)

OTHER PUBLICATIONS

International Search Report as issued in International Patent Application No. PCT/FR2016/052700, dated Mar. 15, 2017.
(Continued)

*Primary Examiner* — Karl E Group
(74) *Attorney, Agent, or Firm* — Pillsbury Winthrop Shaw Pittman LLP (57) ABSTRACT

Fused grains, in which the grains include a matrix of the zirconia-spinel eutectic coating inclusions composed essentially of a zirconia phase or of a spinel phase, the grains exhibit the following overall chemical composition, as percentages by weight expressed in the form of oxides: more than 45.0% and less than 95.0% of $ZrO_2$, more than 3.0% and less than 40.0% of $Al_2O_3$, more than 1.0% and less than 20.0% of MgO, wherein $ZrO_2$, $Al_2O_3$ and MgO together represent at least 95.0% of the weight of the grains.

17 Claims, 2 Drawing Sheets

(51) Int. Cl.
  *C04B 35/488* (2006.01)
  *C04B 35/117* (2006.01)
  *C04B 35/119* (2006.01)
  *C04B 35/18* (2006.01)
  *C04B 35/48* (2006.01)
  *C04B 35/482* (2006.01)
  *C04B 35/66* (2006.01)

(52) U.S. Cl.
  CPC .............. *C04B 35/18* (2013.01); *C04B 35/48* (2013.01); *C04B 35/482* (2013.01); *C04B 35/484* (2013.01); *C04B 35/66* (2013.01); C04B 2235/3206 (2013.01); C04B 2235/3208 (2013.01); C04B 2235/3217 (2013.01); C04B 2235/3225 (2013.01); C04B 2235/3272 (2013.01); C04B 2235/5427 (2013.01); C04B 2235/762 (2013.01); C04B 2235/763 (2013.01); C04B 2235/765 (2013.01); C04B 2235/80 (2013.01)

(56) References Cited

U.S. PATENT DOCUMENTS

| | | | | |
|---|---|---|---|---|
| 7,405,173 B2* | 7/2008 | Marlin | ................ | B22D 41/32 501/105 |
| 2007/0197369 A1* | 8/2007 | Marlin | ................ | B22D 41/32 501/105 |
| 2011/0237420 A1 | 9/2011 | Grote et al. | | |

FOREIGN PATENT DOCUMENTS

| | | |
|---|---|---|
| FR | 2 787 106 A1 | 6/2000 |
| WO | WO 2012/045302 A2 | 4/2012 |

OTHER PUBLICATIONS

Ma, Y. L., et al., "Yttria-magnesia partially stabilized zirconia reinforced with $MgAl_2O_4$ spinel particles," Materials Science and Technology, vol. 14, No. 2, Feb. 1998, XP009188138, pp. 139-142.

Nitani, N., et al., "Thermophysical properties of rock-like oxide fuel with spinel-yttria stabilized zirconia system," Journal of Nuclear Materials, vol. 274, No. 1-2, Aug. 1999, XP055243901, pp. 15-22.

McKittrick, J., et al., "Non-stoichiometry and defect structures in rapidly solidified $MgO$—$Al_2O_3$—$ZrO_2$ ternary eutectics," Materials Science and Engineering A231, Jan. 1997, XP055243906, Retrieved from the Internet: URL:http://ac.els-cdn.com/S0921509397000646/1-s2.0-S0921509397000646-main.pdf?tid=d3e31fb4-c0ea-lle5-85d6-00000aacb360&acdnat=1453455231f32612d199a2e4781bec744e83244532>, pp. 90-97.

Zhang, Q., et al., "Thermal Stability and Microstructural Development of Fine-grained (Y,Mg)-PSZ/$MgAl_2O_4$ Ceramics," Journal of the European Ceramic Society, vol. 18, No. 6, Jun. 1998, XP004121109, pp. 647-651.

Yuan, G., et al., "Effects of In-situ Formation of Magnesium Aluminate Spinel on Performance of Modified Sizing Nozzle," Advanced Materials Research, vol. 750-752, Jan. 2014, XP009188128, pp. 1130-1136.

* cited by examiner

FUSED SPINEL-ZIRCONIA GRAINS AND REFRACTORY PRODUCT OBTAINED FROM SAID GRAINS

CROSS-REFERENCE TO RELATED APPLICATIONS

This application is the U.S. National Stage of PCT/FR2016/052700, filed Oct. 19, 2016, which in turn claims priority to French patent application number 1559926 filed Oct. 19, 2015 and French patent application number 1559925 filed Oct. 19, 2015. The content of these applications are incorporated herein by reference in their entireties.

The invention relates to fused grains for ceramic applications predominantly composed of zirconia and spinel. The invention also relates to a process for the manufacture of such grains, and also to ceramic materials and/or products formed from said grains or comprising them.

The invention also relates to the use of fused grains for the manufacture of refractory products used in particular but not solely in the field of metallurgy, in particular for the manufacture of refractory components for the manufacture or the transformation of metals or metal alloys. They can also be used as coating for metal components or also in the cases of contact between a ceramic component and a metal.

The fused grains according to the invention are thus of use for the manufacture of refractory products and materials, in particular of the type of those used in metallurgy.

In the continuation of the description, for convenience and in accordance with the normal practices in the field of ceramics, said oxides comprising the elements Al, Mg and Zr (or others) will be described with reference to the corresponding simple oxides, that is to say $Al_2O_3$, $MgO$ and $ZrO_2$. Thus, in the description which follows, unless otherwise mentioned, the proportions of the different elements in the overall chemical compositions of the grains according to the invention are given with reference to the weights of the corresponding simple oxides, reported as percentage by weight with respect to the combined oxides present in said grains, even if these are not necessarily present in this simple form in said grains. In contrast, in the present description, a composition truly present of an oxide in said grains is denoted by "phase" or "oxide phase".

In the continuation of the description, without, however, being limited thereto, a description is more particularly given of the use of the grains according to the invention and their advantages in the specific field of refractory products used in metallurgy, that is to say in the preparation of metals or metal alloys, in particular in the preparation of a collar for pouring nozzles or as insert in slide gates. However, it is clearly understood that such grains, by the advantages which they provide, are capable of being advantageously used in numerous other applications of the field of ceramics, in particular in any field for which a high thermal stability and resistance to corrosion, in particular at temperatures of greater than 1000° C., are sought.

In particular, numerous regions of furnaces for the manufacture or treatment of metals or of their alloys require the use of refractory products which are resistant to high temperatures.

For example, slide gates are components used during a continuous pouring of steel to open or close distributors or discharge pouring orifices of pouring ladles in fluid communication, via a sliding nozzle, with ingot molds.

Pouring nozzles and slide gates currently comprise parts consisting of zirconia, generally partially stabilized zirconia.

Patent application CN101786889 describes, for example, nozzles formed from bricks comprising from 12 to 87% of zirconia, 10 to 85% of a magnesium-aluminum spinel and 3 to 15% of an additional material chosen from corundum, zircon, mullite or their mixtures, in combination with an organic binder.

The individual bricks are obtained by sintering, at a temperature of greater than 1400° C., an initial mixture of spinel, zirconium oxide with a purity of greater than 94% and the additional material described above.

However, the studies carried out by the applicant company have shown that such products could, during their use, lose their initial properties of temperature resistance and in particular exhibit cracks necessitating their replacement.

Very particularly, according to the research studies assessed by the applicant company, it appears that this decrease in the durability is directly related to structural modifications of the material constituting the refractory and more particularly to the crystallographic transformation of the zirconium oxide, even partially stabilized, during the successive temperature cycles to which it is subjected. In particular, it has been found, by the applicant company, progressive transformation of the cubic or tetragonal form of the zirconia, even when the latter is partially stabilized, toward the monoclinic form.

In a known way, such a transformation, of martensitic type, results in a microcracking of the constituent grains and consequently a deterioration of the material during its return to a lower temperature.

There thus still currently exists a need for starting materials (in particular in the form of grains) for the manufacture of such refractory materials, in particular in the field of metallurgy, which make it possible to improve, after forming, the thermal stability of said refractory materials.

The aim of the present invention is to respond to such a need, that is to say to provide starting materials, in the form of grains, which make it possible to obtain, after their forming, materials exhibiting an improved resistance to the variations in temperature imposed by their use, in particular for the pouring of metals, and also a greater lifetime.

The present invention relates to fused grains, in particular in the separated form or also in the powder form, in which:
  said grains comprise a matrix of the zirconia-spinel eutectic coating inclusions composed essentially of a zirconia phase or of a spinel phase,
  said grains exhibit the following overall chemical composition, as percentages by weight expressed in the form of oxides:
   more than 45.0% and less than 95.0% of $ZrO_2$,
   more than 3.0% and less than 40.0% of $Al_2O_3$,
   more than 1.0% and less than 20.0% of $MgO$,
  $ZrO_2$, $Al_2O_3$ and $MgO$ together representing at least 95.0% of the weight of said grains.

In the present description, unless expressly specified otherwise, all the percentages are given by weight.

According to some preferred embodiments of the fused grains according to the present invention, which can of course be combined with one another, if appropriate:
  Said grains are composed essentially of a zirconia phase and of a magnesium aluminum oxide of spinel structure.
  The chemical composition comprises more than 68% by weight of $ZrO_2$.
  Said chemical composition comprises less than 25% by weight of $Al_2O_3$.
  The $Al_2O_3/MgO$ ratio by weight is between 1.0 and 5.0 and is preferably between 1.5 and 3.

$ZrO_2$, $Al_2O_3$ and MgO together represent more than 98.0% of the weight of said grains.

The fused grains according to the invention additionally comprise, on the basis of the oxide, more than 0.2% by weight of $Y_2O_3$.

The fused grains according to the invention additionally comprise, on the basis of the oxide, less than 4% by weight of $Y_2O_3$.

The fused grains according to the invention additionally comprise, on the basis of the oxide, more than 0.2% by weight of CaO.

The fused grains according to the invention additionally comprise, on the basis of the oxide, less than 4% by weight of CaO.

More than 50% of the inclusions essentially composed of zirconium oxide exhibit a greater dimension of less than 500 micrometers.

The fused grains according to the invention comprise less than 5% by weight, preferably less than 3% by weight, of an additional alumina phase.

The fused grains according to the invention comprise less than 5% by weight, preferably less than 3% by weight, of an additional magnesia phase.

The spinel phase(s) represent(s) between 5% and 50% by weight of said grains.

The $ZrO_2$-spinel eutectic represents between 10% and 80% by volume of said grains, for example between 20 and 70% by volume of said grains.

Said fused grains comprise a matrix of the zirconia-spinel eutectic coating inclusions essentially composed of a zirconia phase.

The chemical composition of the grains comprises less than 92% of $ZrO_2$ and more preferably less than 90% of $ZrO_2$.

The chemical composition of the grains comprises more than 70% of $ZrO_2$, more preferably more than 72% of $ZrO_2$, indeed even more than 75%, indeed even more than 80% of $ZrO_2$, indeed even more than 85% of $ZrO_2$.

The chemical composition of the grains comprises less than 20% of $Al_2O_3$, indeed even less than 18%, indeed even less than 15% or even less than 12% of $Al_2O_3$.

The chemical composition of the grains comprises more than 7% of $Al_2O_3$, indeed even more than 10% of $Al_2O_3$.

The chemical composition of the grains comprises less than 13% of MgO, indeed even less than 12% of MgO, indeed even less than 10% of MgO.

The chemical composition of the grains comprises more than 2% of MgO, indeed even more than 4%, indeed even more than 5% or even more than 7%.

The chemical composition of the fused grains according to the invention additionally comprises more than 0.2%, indeed even more than 0.5%, indeed even more than 1.0%, of $Y_2O_3$.

The chemical composition of the fused grains according to the invention additionally comprises less than 4.0%, indeed even less than 3.0%, indeed even less than 2.0%, of $Y_2O_3$.

The chemical composition of the fused grains according to the invention additionally comprises more than 0.2%, indeed even more than 0.5%, indeed even more than 1.0%, of CaO.

The chemical composition of the fused grains according to the invention additionally comprises less than 4.0%, indeed even less than 3.0%, indeed even less than 2.0%, of CaO.

The chemical composition of the fused grains according to the invention additionally comprises less than 2.0%, indeed even less than 1.5%, indeed even less than 1.0%, indeed even less than 0.5%, indeed even less than 0.4%, of silica $SiO_2$.

The fused grains comprise a zirconia phase and a spinel phase, these two phases together representing more than 80%, preferably more than 90%, indeed even more than 95%, of the weight of the grains according to the invention.

The zirconia phase(s) comprise more than 90% by weight of $ZrO_2$ equivalent, indeed even more than 95% of $ZrO_2$ or also more than 98% of $ZrO_2$. "zirconia phases" is understood to mean the sum of at least the zirconia present in the inclusions and of the zirconia present in the eutectic.

The zirconia phase(s) of the inclusions additionally comprise more than 1%, indeed even more than 2%, indeed even more than 3%, by weight of MgO.

The zirconia phase(s) of the inclusions is predominantly, indeed even mainly, in the cubic form. Predominantly is understood to mean more than 50% by weight, indeed even more than 60% by weight. Mainly is understood to mean more than 80% by weight, indeed even more than 90% by weight.

Said zirconia phase or phases represent more than 68%, indeed even more than 70%, indeed even more than 80%, indeed even more than 85%, indeed even more than 90%, of the weight of the grains according to the invention. As described above, "zirconia phases" is understood to mean the sum of at least the zirconia present in the inclusions and of the zirconia present in the eutectic.

Said zirconia phase or phases represent less than 95%, indeed even less than 92%, indeed even less than 90%, of the weight of the grains according to the invention, indeed even less than 85% or also less than 80% of the weight of the grains according to the invention.

The spinel phase or phases represent more than 5%, indeed even more than 7%, indeed even more than 10%, indeed even more than 15%, indeed even more than 20%, of the weight of the grains according to the invention. "Spinel phases" is understood to mean the sum of at least the spinel present in the eutectic and, if appropriate, of the spinel present in the inclusions.

The spinel phase or phases represent less than 50%, indeed even less than 45%, indeed even less than 40%, of the weight of the grains according to the invention.

An additional alumina phase is present and represents less than 5%, indeed even less than 3%, indeed even less than 1%, of the weight of the grains according to the invention.

An additional magnesium oxide phase is present and represents less than 10%, indeed even less than 5%, indeed even less than 3%, of the grains according to the invention.

The percentages by weight as given above of the different crystalline phases present in the fused grains according to the invention, in particular of zirconia (in its different forms) and of spinel, can be conventionally measured by X-ray diffraction and Rietveld analysis.

The invention also relates to a process for the manufacture of fused grains as described above, comprising the following stages:

a) mixing starting materials in order to form a starting feedstock, b) melting the starting feedstock until a molten liquid is obtained, c) cooling said molten liquid so that the molten liquid is completely solidified until a solid mass is obtained, d) dividing, in particular by grinding, said mass so as to obtain a mixture of grains.

According to the invention, stages c) and d) described above are not necessarily carried out in this order. The order of stages c) and d) depends in particular on the technique used to obtain the grains. For example, stage c) will be carried out first, for example using CS molds, as described in the patent U.S. Pat. No. 3,993,119, and then stage d) will be carried out in the case where the dividing of the fused mass consists of a grinding. Alternatively, stage d) will be carried out first and then stage c) will be carried out in the case where the dividing of fused mass consists of a molding, such as, for example, described in the application WO2012/045302.

According to the invention, the starting materials are chosen in stage a) so that the grains finally obtained are in accordance with the invention.

Any conventional process for the manufacture of fused grains can be employed, provided that the composition of the starting feedstock makes it possible to obtain grains exhibiting a composition in accordance with that of the grains according to the invention.

In stage b), use is preferably made of an electric arc furnace but all known furnaces can be envisaged, such as an induction furnace or a plasma furnace, provided that they make it possible to completely melt the starting feedstock. The firing is preferably carried out under neutral conditions, for example under argon, or oxidizing conditions, preferably at atmospheric pressure.

In stage c), the molten liquid is preferably cooled slowly, for example over one to several hour(s), until a solid mass the solid mass is obtained.

In stage d), the solid mass is ground according to conventional techniques, until a particle size suited to its subsequent use is obtained.

Said starting feedstock can also comprise unavoidable impurities.

"Impurities" is understood to mean the unavoidable constituents necessarily introduced with the starting materials or resulting from reactions with these constituents. The impurities can in particular be introduced during the preliminary stage of manufacture of the fused grains. The impurities are not necessary constituents but only tolerated constituents. It is considered that a total content of impurities of less than 2%, preferably of less than 1%, does not substantially modify the results obtained.

The invention also relates to refractory products, in particular for use in the field of metallurgy, capable of being obtained by sintering or consolidation of starting materials comprising or consisting of the fused grains according to the invention.

The invention relates in particular to refractory products obtained by sintering or consolidation of starting materials comprising or consisting of the fused grains according to the invention, said grains being sintered or consolidated together, in particular in the form of bricks, in order to constitute said refractory materials.

In particular, the use of the refractory materials or products according to the invention thus more particularly finds its application in the field of metallurgy, it being possible for said products or materials to advantageously be obtained by sintering or consolidation of starting materials comprising or consisting of the fused grains described above.

The invention also relates to refractory products and to their a use in the field of metallurgy, which products are capable of being obtained by sintering of starting materials resulting from said use of fused grains.

In an alternative embodiment of the invention, the invention relates to refractory products and in particular to their use in the field of metallurgy, said products being obtained by sintering or consolidation of starting materials comprising a powder of zirconia and a powder of fused grains according to the invention, said powder of zirconia and said powder of fused grains together representing more than 90% by weight of said starting materials, indeed even more than 95% by weight of said starting materials.

The following definitions are given:

Refractory materials are understood to mean, in accordance with the standard ISO 836:2001 (point 107), a non-metallic material or product (but not excluding the materials or products containing a certain proportion of metal), the chemical and physical properties of which allow it to be employed in a high-temperature environment. For example, such high temperatures can be greater than 600° C., in particular greater than 800° C., indeed even greater than 1000° C.

"zirconia" refers generally to zirconium oxide $ZrO_2$; it generally comprises a small amount of hafnium oxide $HfO_2$, in the form of an unavoidable impurity, it being possible for this amount to range up to 2% of the total amount of zirconia. In the overall chemical composition of the grains according to the invention, in particular as described above, the "$ZrO_2$" percentages correspond in particular to the summed amount of zirconium oxide and of the unavoidable impurity $HfO_2$.

In contrast, "zirconia phase" or "zirconium oxide phase" refers to a phase consisting of zirconia (including the unavoidable impurities, in particular $HfO_2$) or of zirconia which is partially or completely stabilized, in particular by magnesium or yttrium.

"Spinel" refers to the compounds formed by the reaction between magnesium oxide and alumina, often expressed in the $MgAl_2O_4$ form, the crystallographic structure of which can be described as a stack of cubic type of $O^{2-}$ ions in which half of the octahedral sites are occupied by Al cations and a quarter of the tetrahedral sites are occupied by Mg cations. Such a crystallographic structure can also accept an excess of Al or Mg cations in solid solution while remaining a "spinel" compound within the meaning of the present invention.

In other words, a spinel phase in a fused grain according to the present invention can substantially deviate from the conventional spinel formulation $MgAl_2O_4$, that is to say from a 1:1 stoichiometry of the molar ratio of $Al_2O_3$ to MgO.

"Zirconia-spinel eutectic" refers to a microstructure obtained from the eutectic point corresponding, in the $ZrO_2$/$MgAl_2O_4$ pseudo-ternary diagram, to a point with the composition in the region of 59 mol % of zirconia and of 41 mol % of spinel $MgAl_2O_4$, the melting point of which is in the vicinity of 1830° C. (invariant point of the phase diagram for which the liquid to solid reaction is complete).

Figure 1:
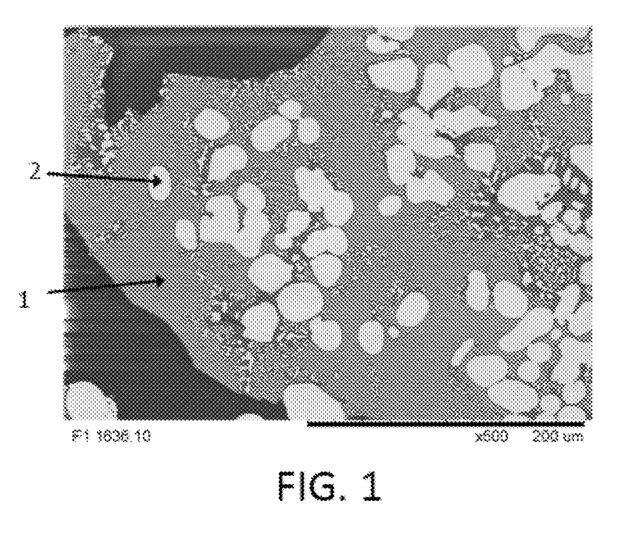
FIG. 1 is a first electron microscopy photograph of the microstructure of a fused grain according to the invention.
Figure 2:
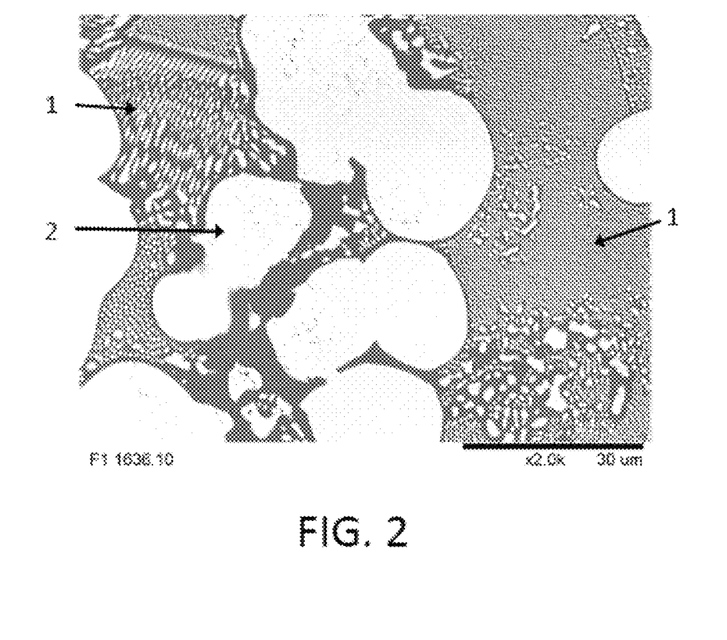
FIG. 2 is a first electron microscopy photograph of the microstructure of the same fused grain as in FIG. 1 but at higher magnification.

The crystallographic structure of such a eutectic is visible in the two electron microscopy photographs given in the appended FIGS. 1 and 2.

FIG. 1 is a first electron microscopy photograph of the microstructure of a fused grain according to the invention.

FIG. 2 is a first electron microscopy photograph of the microstructure of the same fused grain as in FIG. 1 but at higher magnification.

At very high magnification (FIG. 2), it is observed that the matrix made of the preceding eutectic composition and exhibiting a crystallographic structure in which the zirconia phase is very finely dispersed, in the form of short rods or fibers, in the spinel phase. Such a structure is characteristic of a eutectic phase obtained from two crystalline types.

"Fused grains" refers to grains obtained by a manufacturing process comprising at least a stage of melting, a stage of solidification and a stage of dividing, in particular by grinding, by molding or any other known equivalent means.

A powder according to the invention is an assembly of grains according to the invention, the particle size of which is suited to a specific use.

In other words, a use according to the invention is generally carried out starting from a powder consisting of an assembly of grains as described above, the particle size of which is suited to the manufacture of said refractory material.

"Melting" a mixture of precursors or oxides refers to a heat treatment at a temperature sufficiently high for all the constituents of the mixture to be found in the molten (liquid) state.

Conventionally, in the field of ceramics, "sintering" an assembly of grains refers to a heat treatment which makes possible the joining and the growth of their contact interfaces by movement of the atoms inside and between the grains, within the meaning indicated in the standard ISO 836:2001 (point 120).

According to the invention, the sintering temperature of the fused grains is normally between 1100° C. and 1500° C., in particular between 1300° and 1500° C.

Alternatively, consolidation is understood to mean a heat treatment of the grains at a more moderate temperature suitable for the simple shaping of a ceramic component, without strong bonds, however, between the interfaces of the grains, in contrast to the sintering process described above, it being possible for the bonding to be provided by a binder, for example a phenolic resin.

According to the invention, the consolidation temperature of the fused grains is normally between 500° C. and 1100° C., in particular between 600° C. and 1000° C.

The size of the grains is measured according to the well known techniques of laser particle sizing up to 20 micrometers and then by conventional sieving techniques above 20 micrometers.

A better understanding of the invention and its advantages will be obtained on reading the nonlimiting examples which follow. In the examples, all the percentages are given by weight.

EXAMPLES

Comparative example 1 is a powder of zirconia partially stabilized with magnesium oxide. This example is characteristic of the starting materials used today for the manufacture of refractory components in the field of metallurgy, in particular for the pouring of steels.

Comparative example 2 is a mixture of the partially stabilized zirconia powder used in example 1 with a spinel powder comprising approximately 72% of $Al_2O_3$ and 28% of MgO, without additional heat treatment.

Examples 3 and 4 according to the invention are prepared from the necessary proportions of the following starting materials:

Alumina AR75 comprising more than 98% of $Al_2O_3$, sold by Alcan,

MgO sold by the company Altichem, comprising more than 98% of MgO,

Zirconia with a degree of purity of greater than 98%.

The mixture of the initial reactants thus obtained according to examples 3 and 4 is electrically melted with an electric arc furnace, under air. The molten mixture is poured as an ingot. The cooled ingot obtained is ground and sieved in order to obtain a powder of fused grains, the diameter of which is similar to that of the powders used in examples 1 and 2.

The samples according to examples 1 to 4 are subsequently analyzed. The overall chemical composition of the grains, indicated as percentages by weight on the basis of the oxides, was determined by X-ray fluorescence. The results are combined in table 1 which follows:

TABLE 1

|  | Zirconia ($ZrO_2$ + $HfO_2$) | $Al_2O_3$ | MgO | $TiO_2$ | $SiO_2$ | $Fe_2O_3$ | CaO |
| --- | --- | --- | --- | --- | --- | --- | --- |
| Example 1 (comparative) | 95.8 | 0.2 | 3.3 | 0.1 | 0.1 | 0.1 | 0.2 |
| Example 2 (comparative) | 68.9 | 21.0 | 9.7 | 0.1 | 0.1 | 0.1 | 0.1 |
| Example 3 (invention) | 50.1 | 34.4 | 14.8 | 0.1 | 0.2 | 0.2 | 0.2 |
| Example 4 (invention) | 72.0 | 17.0 | 9.6 | 0.1 | 0.2 | 0.1 | 0.2 |

The qualitative analysis of the phases present in the grains according to examples 1 to 4 is subsequently determined by X-ray diffraction. The results are combined in table 2 which follows:

TABLE 2

|  | Phases detected |
| --- | --- |
| Example 1 (comparative) | Tetragonal or cubic zirconia/monoclinic zirconia |
| Example 2 (comparative) | Tetragonal or cubic zirconia/spinel/monoclinic zirconia |
| Example 3 (invention) | Cubic zirconia/spinel/monoclinic zirconia |
| Example 4 (invention) | Cubic zirconia/spinel |

The resistance with regard to temperature is evaluated by comparing the phases detected before and after having placed the samples of examples 1 to 4 at 1400° C. for 1 hour, that is to say at a temperature lower than the minimum sintering temperature described in the patent application CN101786889, section [0012].

Such conditions also appear representative of the conditions undergone by a material formed from the different grains during its use as refractory component in metallurgy.

As indicated above, the resistance with regard to temperature of said material is related to the degree of transformation of the zirconia phase from the cubic or tetragonal form toward the monoclinic form during a cycle comprising a rise and a fall in temperature, this transformation resulting in a known way in a microcracking of the constituent grains of the material and consequently in a deterioration in the macroscopic properties of the latter, as explained above.

More specifically, for each example, the content of monoclinic zirconia is determined by X-ray diffraction before and after the test. The results are combined in table 3 which follows:

TABLE 3

|  | Monoclinic zirconia | |
| --- | --- | --- |
|  | Before the test | After the test |
| Example 1 (comparative) | 46% | 70% |
| Example 2 (comparative) | 29% | 59% |
| Example 3 (invention) | 6% | 34% |
| Example 4 (invention) | Not detected | <0.5% |

The results given in table 3 show that the fused grains according to the invention exhibit a much improved stability with respect to the comparative examples. By reducing the changes in phases, in particular the change from cubic or tetragonal zirconia to monoclinic zirconia, associated dimensional variations are avoided and thus the risk of cracking of the refractory products comprising or consisting of these grains are avoided.

The microstructure of the grains obtained according to example 4 was observed by electron microscopy.

The compositions of the different phases constituting the grains can be obtained by wavelength spectrometry (Castaing EPMA microprobe). This measurement makes it possible to confirm the visual observations and to specify the compositions of the different phases and inclusions observed in the electron microscopy photographs of FIGS. 1 and 2.

The photographs are given in FIGS. 1 and 2. The microstructure, very different from those observed to date on grains obtained by sintering in the solid state, exhibits two very different regions which are perfectly observable with the microscope:

A matrix (1) exhibiting an alternating arrangement of zirconia phase and spinel phase, in the form of fibers or of short rods of very low thickness. This very fine microstructure is characteristic of a eutectic phase obtained from two crystalline types.

Occlusions (2) of a zirconia phase, which occlusions are coated in said matrix of eutectic.

Without it being possible for this explanation to be regarded as definitive, the stabilization of the zirconia observed might thus be related to this specific microstructure obtained by virtue of the overall chemical composition made of the different oxides as described above and in particular of the presence of the $ZrO_2$-spinel eutectic phase surrounding occlusions of zirconia or of spinel, preferably of zirconia. By virtue of such a microstructure, it becomes possible to use materials comprising very high zirconia contents, very particularly for the manufacture of refractory materials.

The invention claimed is:

1. Fused grains, in which:
   said grains comprise a matrix of a zirconia-spinel eutectic coating inclusions composed essentially of a zirconia phase or of a spinel phase,
   said grains exhibit the following overall chemical composition, as percentages by weight expressed in the form of oxides:
   more than 45.0% and less than 95.0% of $ZrO_2$,
   more than 3.0% and less than 40.0% of $Al_2O_3$,
   more than 1.0% and less than 20.0% of MgO,
   $ZrO_2$, $Al_2O_3$ and MgO together represent at least 95.0% of the weight of said grains.

2. The fused grains as claimed in claim 1, the chemical composition of which comprises more than 68% by weight of $ZrO_2$.

3. The fused grains as claimed in claim 1, the chemical composition of which comprises less than 25% by weight of $Al_2O_3$.

4. Fused grains, in which:
   said grains comprise a matrix of a zirconia-spinel eutectic coating inclusions composed essentially of a zirconia phase or of a spinel phase,
   said grains exhibit the following overall chemical composition, as percentages by weight expressed in the form of oxides:
   more than 45.0% and less than 95.0% of $ZrO_2$,
   more than 3.0% and less than 40.0% of $Al_2O_3$,
   more than 1.0% and less than 20.0% of MgO,
   $ZrO_2$, $Al_2O_3$ and MgO together represent at least 95.0% of the weight of said grains, and in which the $Al_2O_3$/MgO ratio by weight is between 1.0 and 5.0.

5. The fused grains as claimed in claim 1, in which $ZrO_2$, $Al_2O_3$ and MgO together represent more than 98.0% of the weight of said grains.

6. The fused grains as claimed in claim 1, additionally comprising, on the basis of the oxide, more than 0.2% and less than 4% by weight of $Y_2O_3$.

7. The fused grains as claimed in claim 1, additionally comprising, on the basis of the oxide, more than 0.2% and less than 4% by weight of CaO.

8. The fused grains as claimed in claim 1, in which more than 50% of the inclusions essentially composed of zirconium oxide exhibit a greater dimension of less than 500 micrometers.

9. The fused grains as claimed in claim 1, in which the spinel phase represents between 5% and 50% by weight of said grains.

10. The fused grains as claimed in claim 1, in which the $ZrO_2$-spinel eutectic represents between 10% and 80% by volume of said grains.

11. A refractory ceramic material or product obtained by sintering or consolidation of fused grains, or of a mixture of starting materials comprising fused grains, as claimed in claim 1.

12. A method comprising manufacturing a refractory material with fused grains, in which:
   said grains comprise a matrix of a zirconia-spinel eutectic coating inclusions composed essentially of a zirconia phase or of a spinel phase,
   said grains exhibit the following overall chemical composition, as percentages by weight expressed in the form of oxides:
   more than 45.0% and less than 95.0% of $ZrO_2$,
   more than 3.0% and less than 40.0% of $Al_2O_3$,
   more than 1.0% and less than 20.0% of MgO,
   $ZrO_2$, $Al_2O_3$ and MgO together representing at least 95.0% of the weight of said grains.

13. The method as claimed in claim 12, wherein the refractory material is a refractory material for metallurgy.

14. The method as claimed in claim 12, wherein said refractory material is obtained by sintering starting materials comprising said fused grains or consisting of said fused grains.

15. The method as claimed in claim 12, wherein said refractory material is obtained by consolidation of starting materials comprising said fused grains or consisting of said fused grains.

16. The method as claimed in claim 12, wherein said refractory material is obtained by sintering or consolidation of starting materials comprising a powder of zirconia and a powder of said fused grains, said powder of zirconia and said powder of fused grains together representing more than 90% by weight of said starting materials.

17. The fused grains as claimed in claim 4, in which the $Al_2O_3/MgO$ ratio by weight is between 1.5 and 3.0.

* * * * *

UNITED STATES PATENT AND TRADEMARK OFFICE
CERTIFICATE OF CORRECTION

PATENT NO. : 10,479,730 B2
APPLICATION NO. : 15/769272
DATED : November 19, 2019
INVENTOR(S) : Stéphane Raffy et al.

Page 1 of 1

It is certified that error appears in the above-identified patent and that said Letters Patent is hereby corrected as shown below:

On the Title Page

Item (30) Foreign Application Priority Data:
Please add the omitted Foreign Priority Application and filing date as follows:
Oct. 19, 2015 (FR) .............................. 1559925

Signed and Sealed this
Fourteenth Day of January, 2020

Andrei Iancu
*Director of the United States Patent and Trademark Office*